UNITED STATES PATENT OFFICE.

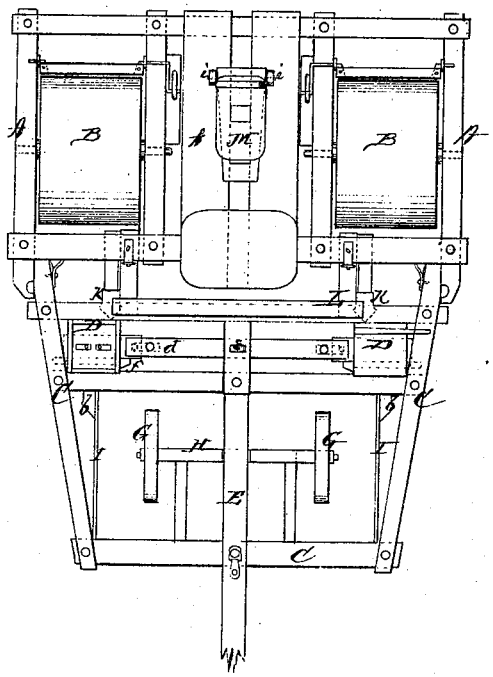
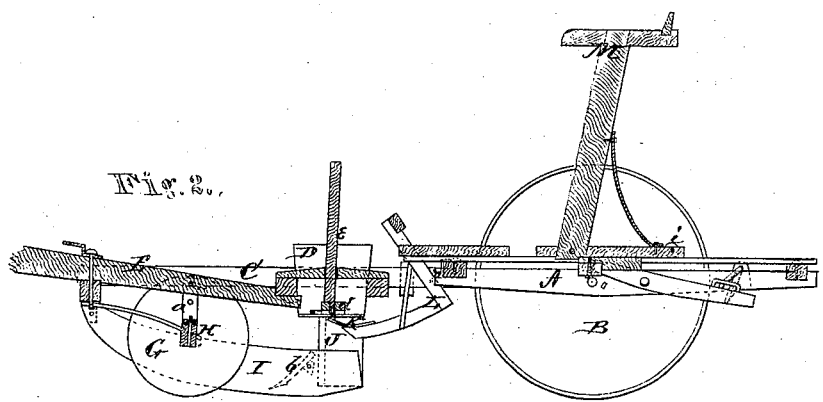

JACOB R. RANDALL, OF CAMARGO, ILLINOIS.

IMPROVEMENT IN CORN-PLANTERS.

Specification forming part of Letters Patent No. 110,788, dated January 3, 1871.

*To all whom it may concern:*

Be it known that I, JACOB R. RANDALL, of Camargo, in the county of Douglas and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my machine in plan view, and Fig. 2 is a longitudinal vertical section of the same.

The nature of my invention consists in the construction and arrangement of a corn-planter, as will be hereinafter fully set forth.

In order to enable others skilled in the art to which my invention appertains to make and use the same, I will now proceed to describe its construction and operation, referring to the annexed drawings.

A represents the main frame of my machine, in which frame are mounted two heavy broad rollers, B B.

In the front end of the main frame A is pivoted another frame, C, in which are placed the corn-boxes D D, and the tongue E projects forward from the center of said frame.

In the frame C, or, rather, under the same, are placed two gage-wheels, G G, upon the ends of an axle, H, said axle being attached to the rear end of the tongue E by a clevis, *a*, in such a manner that it can be raised and lowered at will to cause the wheels G G to regulate the depth at which the colters are to work.

To the front end of the frame C are attached the cutters I I, the rear ends of which are secured to the seed-conductors J J from the bottoms of the grain-boxes D D. These cutters enter the soil at the desired depth, and mold-boards *b b*, attached to their outer sides near the rear ends, make the openings for the corn to be deposited. Each seed-box D has two openings in its bottom, under which a slide, *d*, works, said slide being operated by a lever, *e*, in the center of the frame C. This slide *d* has at each end—that is, within each corn-box—four holes, two larger and two smaller, either set of which may be made to correspond with or come under the openings in the bottom of the corn-box by changing the key *f* from one side to the other. The corn, being deposited through the conductor J, is covered by a shovel, K, which follows after, said shovels being attached to a small frame, L, hinged to the front end of the main frame A, so that the same can be readily raised or lowered at will. These shovels make the row the highest, thus causing more pressure on the corn than elsewhere when the rollers B B pass over it. These rollers, being very wide, leave the ground more on a level, so that the sun may warm the ground better and the corn come up quicker. The covering plows or shovels make a furrow on one side of the row, where the water will stand in case of rain and not bake in the ground on the corn.

The driver's seat M slides back and forth on rollers *i i* in a slot on the frame A, so that in turning it may be moved to the rear end of the frame or platform, and the driver's weight raises the cutters and plows out of the ground.

Having thus fully described my invention, what I claim as new, and desire to secure by Letters Patent, is—

1. The hinged frame C, adjustable gage-wheels G G, cutters I I, with mold-boards *b b*, boxes D D, conductors J J, and slide *d*, all constructed and arranged to operate substantially as and for the purposes herein set forth.

2. In combination with subject-matter of foregoing clause, the main frame A, wide rollers B B, and movable seat M, said main frame having the frame L, with shovels K K, hinged at its front end, substantially as and for the purposes herein set forth.

In testimony that I claim the above I have hereunto subscribed my name in the presence of two witnesses.

JACOB R. RANDALL.

Witnesses:
THEO. ELFES,
JOHN W. PIERCE.